US010762456B2

(12) United States Patent
Baker et al.

(10) Patent No.: US 10,762,456 B2
(45) Date of Patent: Sep. 1, 2020

(54) MIGRATION ESTIMATION WITH PARTIAL DATA

(71) Applicant: International Business Machines Corporation, Armonk, NY (US)

(72) Inventors: John K. Baker, Forest Hills, NY (US); Yun-Wu Huang, Summit, NJ (US); Matthew A. Markley, Hays, KS (US); Venkata Vinay Parisa, Charlotte, NC (US); Birgit M. Pfitzmann, Samstagern (CH)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 14/501,278

(22) Filed: Sep. 30, 2014

(65) Prior Publication Data

US 2016/0092813 A1    Mar. 31, 2016

(51) Int. Cl.
    *G06Q 10/00*     (2012.01)
    *G06Q 10/06*     (2012.01)

(52) U.S. Cl.
    CPC .............................. *G06Q 10/06313* (2013.01)

(58) Field of Classification Search
    None
    See application file for complete search history.

(56) References Cited

U.S. PATENT DOCUMENTS

| 6,728,877 | B2 * | 4/2004 | Mackin ..................... G06F 8/00 713/1 |
| 8,055,371 | B2 | 11/2011 | Sanford et al. |
| 8,184,633 | B2 | 5/2012 | Ionescu et al. |
| 8,494,964 | B1 * | 7/2013 | Sanderson ............ G06F 21/121 380/227 |
| 8,612,284 | B1 * | 12/2013 | Sharif ..................... G06F 3/067 705/400 |
| 2006/0242154 | A1 * | 10/2006 | Rawat ................... G06F 16/168 |
| 2007/0050361 | A1 * | 3/2007 | Al-Masri .......... G06F 17/30115 |

(Continued)

OTHER PUBLICATIONS

Jiawei Han, Micheline Kamber, Jian Pei (Data Mining Concepts and Techniques, Third Edition, ISBN 978-0-12-381479-1, Published Date: Jun. 22, 2011). (Year: 2011).*

(Continued)

*Primary Examiner* — Hafiz A Kassim
(74) *Attorney, Agent, or Firm* — Samuel Waldbaum; Otterstedt, Wallace & Kammer, LLP

(57) ABSTRACT

Access is obtained to raw historic information technology migration data, which data is transformed in accordance with a classification scheme to obtain classified key historic information technology migration data. A statistical model with conditional distributions of the key historic information technology migration data is built. Prior to a new information technology migration project, access is obtained to incomplete data characterizing the new information technology migration project. The statistical model is used to derive data missing from the incomplete data characterizing the new information technology migration project, to obtain derived data. At least one of a migration plan and an estimate for the new information technology migration project is created based on the incomplete data and the derived data.

20 Claims, 11 Drawing Sheets

(56) References Cited

U.S. PATENT DOCUMENTS

| | | | | |
|---|---|---|---|---|
| 2008/0288889 | A1* | 11/2008 | Hunt | G06Q 30/02 715/810 |
| 2009/0177598 | A1* | 7/2009 | Bhaskar | G06N 3/126 706/13 |
| 2011/0004513 | A1* | 1/2011 | Hoffberg | G06Q 30/0207 705/14.1 |
| 2011/0004574 | A1* | 1/2011 | Jeong | G06F 9/5066 706/12 |
| 2011/0126197 | A1* | 5/2011 | Larsen | G06F 9/455 718/1 |
| 2011/0161470 | A1* | 6/2011 | Baskaran | G06F 15/16 709/220 |
| 2011/0167221 | A1* | 7/2011 | Pangal | G06F 11/1453 711/117 |
| 2012/0047339 | A1* | 2/2012 | Decasper et al. | G06F 11/1076 711/162 |
| 2012/0304179 | A1* | 11/2012 | Devarakonda | G06Q 10/00 718/102 |
| 2012/0331114 | A1 | 12/2012 | Garg et al. | |
| 2013/0024494 | A1 | 1/2013 | Guarrieri | |
| 2013/0031550 | A1 | 1/2013 | Choudhury et al. | |
| 2013/0117337 | A1* | 5/2013 | Dunham | G06F 17/30194 707/827 |
| 2014/0074539 | A1* | 3/2014 | Doering | G06Q 10/06315 705/7.25 |
| 2014/0278754 | A1* | 9/2014 | Cronin | G06F 17/30539 705/7.29 |

OTHER PUBLICATIONS

Upendra Sharma (Elastic Resource Management in Cloud Computing Platforms, University of Massachusetts-Amherst, May 2013). ( Year: 2013).*

Qiang Guan, Ziming Zhang, and Song Fu (Ensemble of Bayesian predictors and decision trees for proactive failure management in cloud computing systems, Journal of Communications, vol. 7, No. 1, Jan. 2012). (Year: 2012).*

Kun Bai, Niyu Ge, Hani Jamjoom, Ea-Ee Jan, Lakshmi Renganarayana, Xiaolan Zhang (What to Discover Before Migrating to the Cloud, IBM T. J. Watson Research Center, Date of Conference: May 27-31, 2013, Date Added to IEEE Xplore: Aug. 1, 2013). ( Year: 2013).*

David Lomet (Data Engineering, vol. 23 No. 4 IEEE Computer Society, Dec. 2000) (Year: 2000).*

Peter Haase, Tobias Math''aß, Michael Schmidt, Andreas Eberhart, and Ulrich Walther (Semantic Technologies for Enterprise Cloud Management, Springer-Verlag Berlin Heidelberg 2010)). (Year: 2010).*

Wang et al., "Co-Con: Coordinated Control of Power and Application Performance for Virtualized Server Clusters," Quality of Service, 2009. IWQoS. 17th International Workshop on. IEEE, 2009.

Friedrich et al. "Integration of Performance Measurement and Modeling for Open Distributed Processing," Chapman and Hall (London), 1995.

He et al., "To Migrate or to Wait: Bandwidth-Latency Tradeoff in Opportunistic Scheduling of Parallel Tasks," INFOCOM, 2012 Proceedings IEEE. IEEE, 2012.

Khajeh-Hosseini et al. "Cloud Migration: A Case Study of Migrating an Enterprise IT System to IaaS," 2010 IEEE 3rd International Conference on Cloud Computing.

Hong et al., "Selective Commitment and Selective Margin: Techniques to Minimize Cost in an IaaS Cloud," Performance Analysis of Systems and Software (ISPASS), 2012 IEEE.

Chang-Shing Perng; Rong Chang; Tao Tao; So, E.; Mihwa Choi; Shaikh, H.: Universal economic analysis methodology for IT transformations; 2012 IEEE Network Operations and Management Symposium (NOMS), pp. 558-561.

VMWare ThinApp Calculator, downloaded from http://roitco.vmware.com/ThinApp/summary on Sep. 5, 2013.

Van T. K. Tran, Kevin Lee, Alan Fekete, Anna Liu and Jacky Keung: Size Estimation of Cloud Migration Projects with Cloud Migration Point (CMP), 2011 International Symposium on Empirical Software Engineering and Measurement (ESEM), downloaded from http://www.nicta.com.au/pub?doc=4766 on Sep. 5, 2013.

Peter Mell and Tim Grance, The NIST Definition of Cloud Computing, Version 15, Oct. 7, 2009.

* cited by examiner

Sample Key Data Classes

- Operating system
  - Class (Windows, Unix, other)
  - Name (e.g., RHEL, SLES, AIX, Solaris)
  - Version
- Software and function
  - Function type: web server, application server, database server, infrastructure server, packaged application etc., or multi-use
  - Environment: Development, test, production
  - Software name
  - Software version or age
- Hardware
  - Virtualized?
  - Platform, e.g., x, p, z
  - Vendor
  - Model / Age
  - Model / Size
- Storage
  - Local, SAN, NAS
  - Size allocated, size used
- Criticality
  - Yes, no or High, Medium, Low
  - Exact SLA
  - Regulated? (Such as Sarbanes-Oxley, HIPAA, PCI)
- Clusteredness
  - Yes / no
  - Partners
  - Load-balanced?
- Special factors
  - Disk encryption
- "Profile" data classes (not input to migration plans themselves, but can impact distributions)
  - Industry
  - Country

FIG. 7

| Distribution Name | Table | Target Field | Source Field | Source Value | Group With ID | Rank | Active |
|---|---|---|---|---|---|---|---|
| WIN_PorV_SERVER_TYPE | SERVER_TAXONOMY | SERVER_TYPE | OS_SHORT | WINDOWS | | 1000 | Yes |
| WIN_V_FP_COSTS | SERVER_TAXONOMY | FP_COSTS | | | 5086 | 1001 | Yes |
| WIN_V_SUPPORT_FTE | SERVER_TAXONOMY | SUPPORT_FTE | | | 5086 | 1002 | Yes |
| WIN_V_FP_COSTS | SERVER_TAXONOMY | FP_COSTS | | | 5085 | 1003 | Yes |
| WIN_V_SUPPORT_FTE | SERVER_TAXONOMY | SUPPORT_FTE | | | 5085 | 1004 | Yes |
| WIN_V_HOST_MODEL | SERVER_TAXONOMY | HOST_MODEL | | | 5086 | 1005 | Yes |

MIGRATION ESTIMATION WITH PARTIAL DATA

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to information technology (IT) and the like.

BACKGROUND OF THE INVENTION

Enterprises perform many IT changes, e.g., transformation to cloud (IaaS or later PaaS or SaaS—defined below), data center relocation or consolidation, server consolidation, application modernization, refresh, or restructuring necessitated by new enterprise applications. These activities are referred to herein as "migration." Typically, before even committing to a migration project, an enterprise needs a plan of the required tasks that is sufficiently detailed to estimate a timeline and the required resources.

A migration plan depends on many factors, e.g., current hardware and its configurations, current operating systems and their versions and settings, software, IT management infrastructure, network and storage, dependencies among these components, and criticality of the enterprise applications supported by these IT components. Unfortunately, in today's enterprises, many of these factors are either not tracked reliably or not tracked at all. Therefore, it is possible that, at the early planning stage, only a minority of these factors are known.

Typically, without sufficient data of aforementioned factors, adequate migration plans cannot be made at the planning stage. Hence, migration timelines and costs can only be determined based on very rough estimates such as "migrating×servers/weekend" or "average cost to migrate a Windows server is $X." This often leads to either underestimates (and thus later cost overruns and deadline misses) or overestimates (and thus to rejection of projects that would in reality have been useful, and in particular to unnecessary deal losses for an IT service provider).

SUMMARY OF THE INVENTION

Principles of the invention provide techniques for migration estimation with partial data. In one aspect, an exemplary method includes the steps of obtaining access to raw historic information technology migration data; transforming the raw historic information technology migration data in accordance with a classification scheme to obtain classified key historic information technology migration data; building a statistical model with conditional distributions of the key historic information technology migration data; prior to a new information technology migration project, obtaining access to incomplete data characterizing the new information technology migration project; using the statistical model to derive data missing from the incomplete data characterizing the new information technology migration project, to obtain derived data; and creating at least one of a migration plan and an estimate for the new information technology migration project based on the incomplete data and the derived data.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

- It transforms a partially complete data set into a complete data set with mixture of real and estimated data. With a more complete data set, analyses and mathematical modeling, e.g., summation, average, projection, can be more effectively applied within some confidence level of accuracy.
- The data set can be more quickly available for migration cost and timeline estimation, which otherwise could take a long time to fill in manually. This enables more timely response thus can be an advantage in competition for migration contracts.
- The estimated data can be modeled by historical data, which through time may improve the accuracy of the data, hence the accuracy of migration cost and timeline estimation.

These and other features and advantages of the present invention will become apparent from the following detailed description of illustrative embodiments thereof, which is to be read in connection with the accompanying drawings.

BRIEF DESCRIPTION OF THE DRAWINGS

FIG. 7 depicts exemplary sample key data classes, according to an embodiment of the present invention;

FIG. 9 depicts at least a portion of an exemplary screen shot, according to an embodiment of the present invention;

FIG. 11 depicts a portion of another exemplary screen shot, according to an embodiment of the present invention.

DETAILED DESCRIPTION OF PREFERRED EMBODIMENTS

Figure 1:
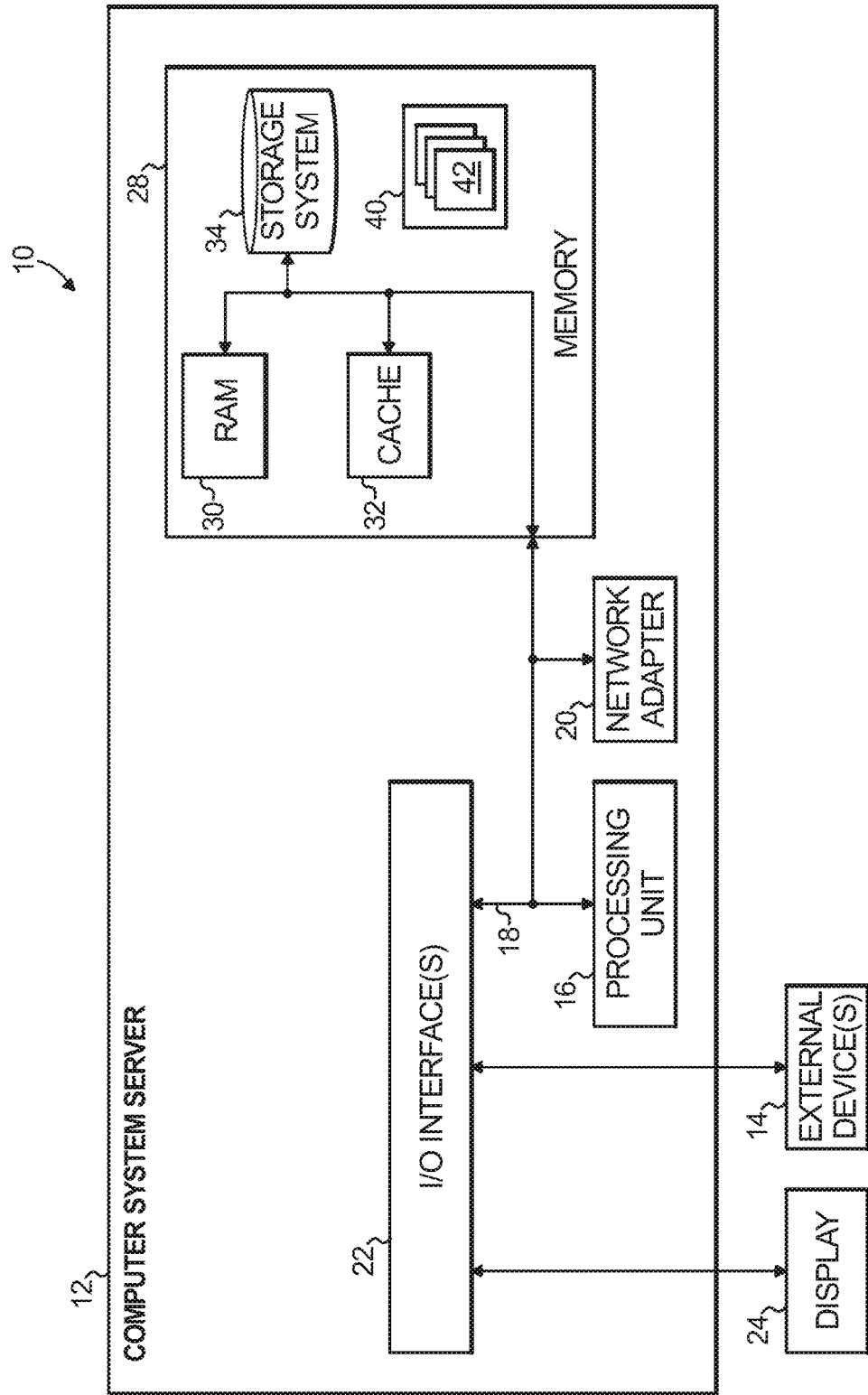
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
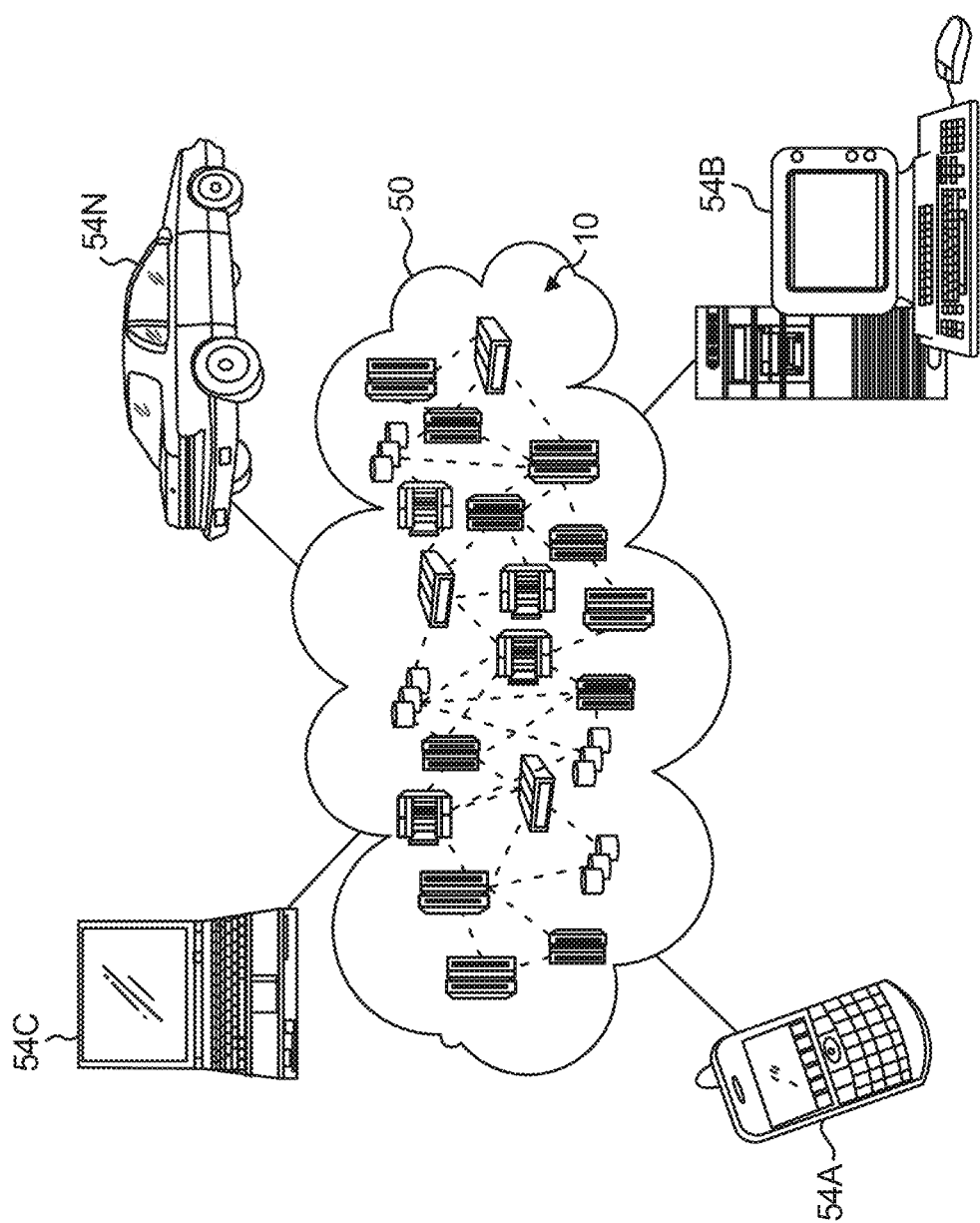
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
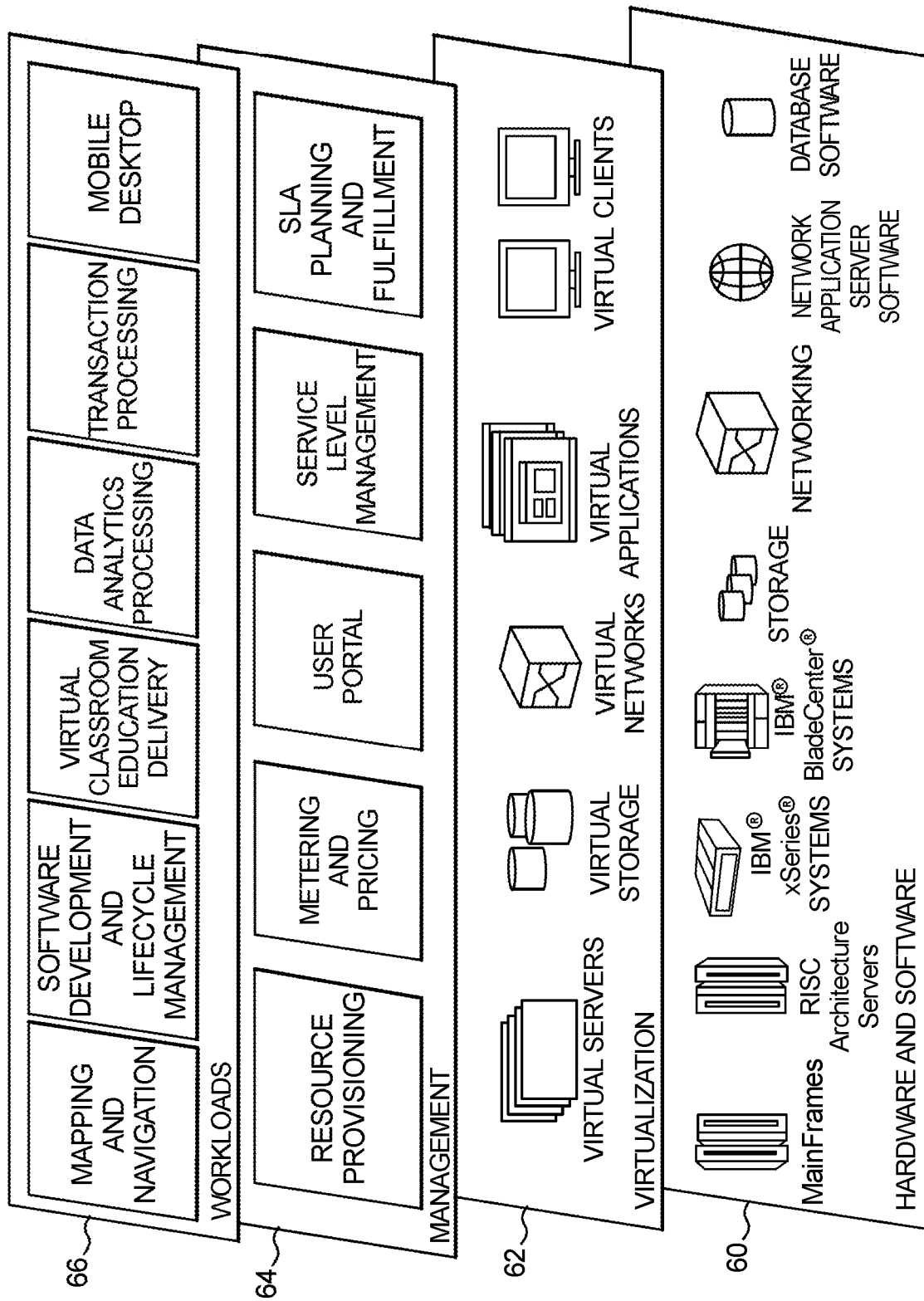
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

One or more embodiments provide a method that uses statistical analysis of historical data to simulate and then augment partial migration factor data, thereby providing sufficient information that is required for devising improved migration plans. This is particularly useful for an IT service provider, which has historical data from other migrations and other enterprises.

In one or more embodiments, the method includes two main stages, namely, the modeling stage and the planning stage. In the modeling stage, store detailed data about IT resources collected during all migration projects in a data repository; select and rank key factors (data types of their combinations) based on their effect on the estimated time and resources of migration plans; and build a statistic model that uses conditional probability to model the estimated distribution of data for factors (without real data) that are dependent on other factors with specific data. For example, the estimated data distribution for the virtualization factor may be 40% un-virtualized and 60% virtualized when the OS factor is known to be Windows. In the planning stage, in the early planning phase of a new migration project, collect whatever data is available; augment the data according to the statistical model to derive at least the key factors; and estimate times and resources for migration plans based on the estimated key factors.

As noted, enterprises perform many IT changes, e.g., transformation to cloud (IaaS or later PaaS or SaaS), data center relocation or consolidation, server consolidation, application modernization, refresh, or restructuring necessitated by new enterprise applications; these are referred to collectively herein as "migration." Typically, before even committing to a migration project, an enterprise needs a plan of the required tasks that is sufficiently detailed to estimate a timeline and the required resources. A migration plan depends on many factors, e.g., current hardware and its configurations, current operating systems and their versions and settings, software, IT management infrastructure, network and storage, dependencies among these components, and criticality of the enterprise applications supported by these IT components.

Unfortunately, in today's enterprises, many of these factors are not tracked at all, or are not reliably tracked. Hence, at the early planning stage, only a minority of these factors are known. Thus, typically, no real plans are made at this time, and timelines and costs are based on very rough estimates such as "one migrates×servers/weekend" or "average cost to migrate a Windows server is $X." This often leads to either underestimates (and thus later cost overruns and deadline misses) or overestimates (and thus to rejection of projects that would in reality have been useful, and in particular to unnecessary deal losses for an IT services provider).

Figure 4:
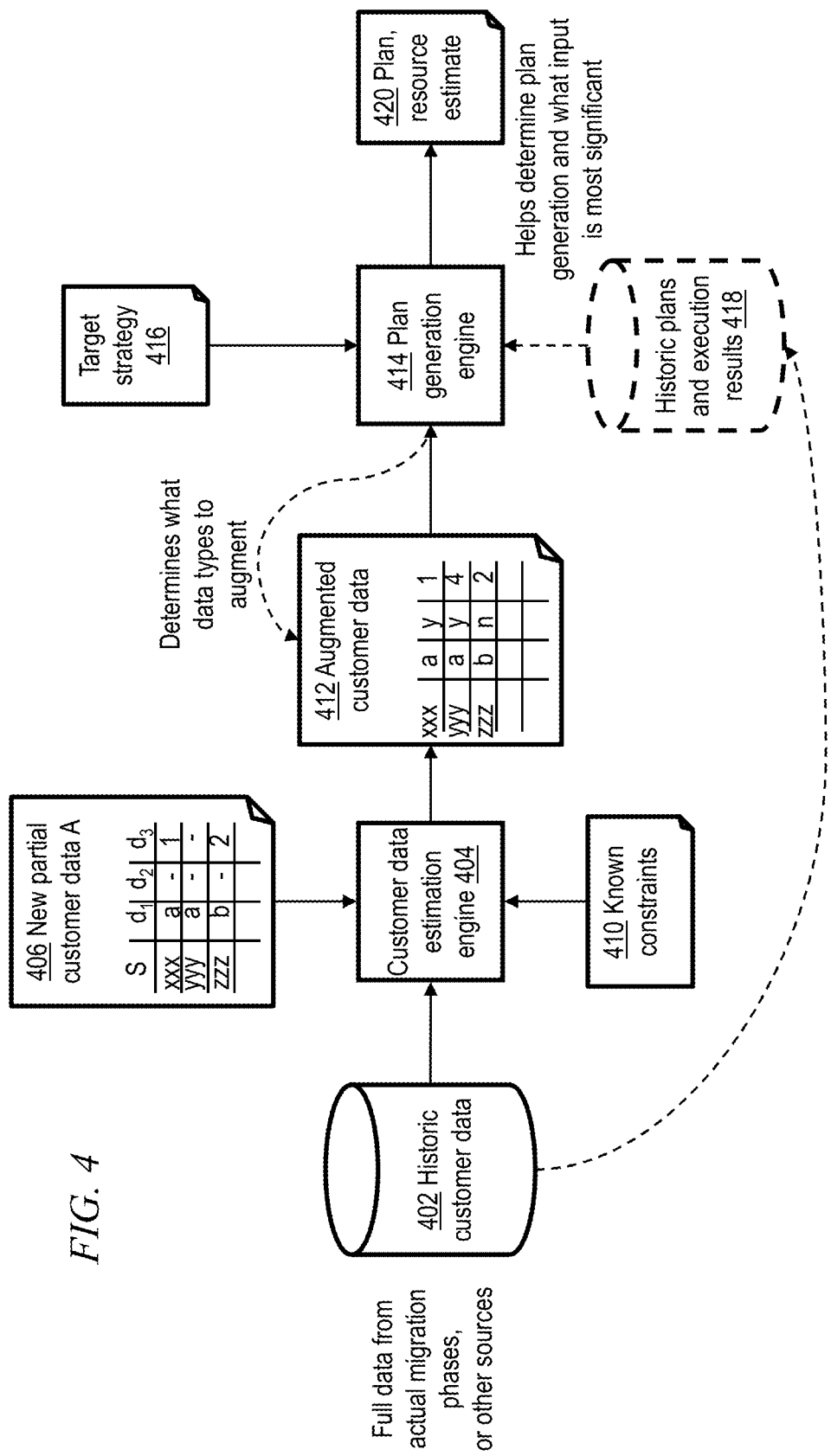
FIG. 4 depicts an exemplary system block diagram, according to an embodiment of the present invention.

One or more embodiments advantageously provide a model that combines user-provided data with historic data. FIG. 4 presents an exemplary system block diagram. Database 402 includes historic customer data; e.g., full data from actual migration phases, or other sources. Customer data estimation engine 404 uses data from database 402, as well as known constraints 410 and new partial customer data 406, 408 to produce augmented customer data 412. The element 406 depicts a partial data set in a table form with missing data items in exemplary column d2 and row 2. The element 402 represents a database storing historical data. If the historical data in 402 shows that if, based on the distribution of data item sets d1 and d3, certain patterns exists for data item set d2, then such patterns can be used to construct an estimated data set for d2. Such logic can be used in element 404 to create an augmented data set as shown in element 412.

It is worth noting as an aside that, in some cases, data is missing across multi-dimensions and the patterns adopted from the historical data for some dimensions creates inconsistency for other dimensions based on the patterns (or distributions) of the known data so far. In these cases, one simple solution is to fill missing data for some dimensions using patterns from the historical data, and using patterns from existing partial data to augment the remaining dimensions with missing data.

Once the data is augmented 412 in a completed form, it is then ready to be used to create plans for IT transformation effort, such as server migration to cloud or other types of targets. The creation of plans based on the augmented data 412 is performed by the plan generation engine depicted as element 414. Not all missing data need to be filled by estimated data items. Those that need to be filled are determined by the Target strategy 416. The Target strategy 416 specifies what dimensions (or types) of data need to be augmented based on the requirement of transformation target, such as the specifications of the target cloud, and other business constraints. The plan generation engine 414 uses both augmented data sets 412, and historical plan information and data from their respective execution results 418, such as cost, time, success rate, etc., to create the migration (or transformation) plan with resource estimation 420.

As noted, one or more embodiments provide a statistical estimation solution for migration plans based on historical data. This is particularly useful for a service provider, which has historical data from other migrations and other enterprises. In one or more embodiments, as also noted, the method has two stages: stage 1 includes the historical data generation and preparation steps (FIG. 5); stage 2 includes the steps that use historical data to augment partial data sets in creating the migration plan (FIG. 6). In stage 1, corresponding to advance computations, as seen at 502 in FIG. 5, detailed data during some or all (prior) migration projects are stored in raw data form into a database 504. Next, the previously executed migration plans and their respective result data sets 508, e.g., including time and cost, are used to help structure the raw data into more consumable formats. This structuring process is performed in 2 steps, the data modeling step 506 and the raw data transformation step 512. In the data modeling phase, historical migration plans and their results 508 are used to determine what dimensions (data types) and classifications are important. The data structure, classification, and relations are then determined and can be stored in a meta format in a database 510. Next, in the transformation phase 512, raw data are read from 514 and transformed into structured data using the formats stored in 510. The structured data is stored in 514.

Once the data is structured and stored in 514, it can be used to create statistical models 516. The statistical models can be as simple as some distribution ratios within same data dimension. It can also include complex relations such as dependencies across multiple data dimensions. Each import of the raw data, e.g., after or during a migration effort, may introduce new data classes, which contribute to the creation of new statistical models or enhancement of the existing models. The creation or enhancement of statistical models is based on existing data classes 515 and potentially newly created data classes in 514. Other constraints or rules can be added to augment the models 520. For example, one constraint may be that the AIX operating system can only be on the Power platform. Another constraint maybe that the target cloud can only support RAM size up to 256 gigabytes. The created or enhanced statistical models are stored in 518.

Figure 5:
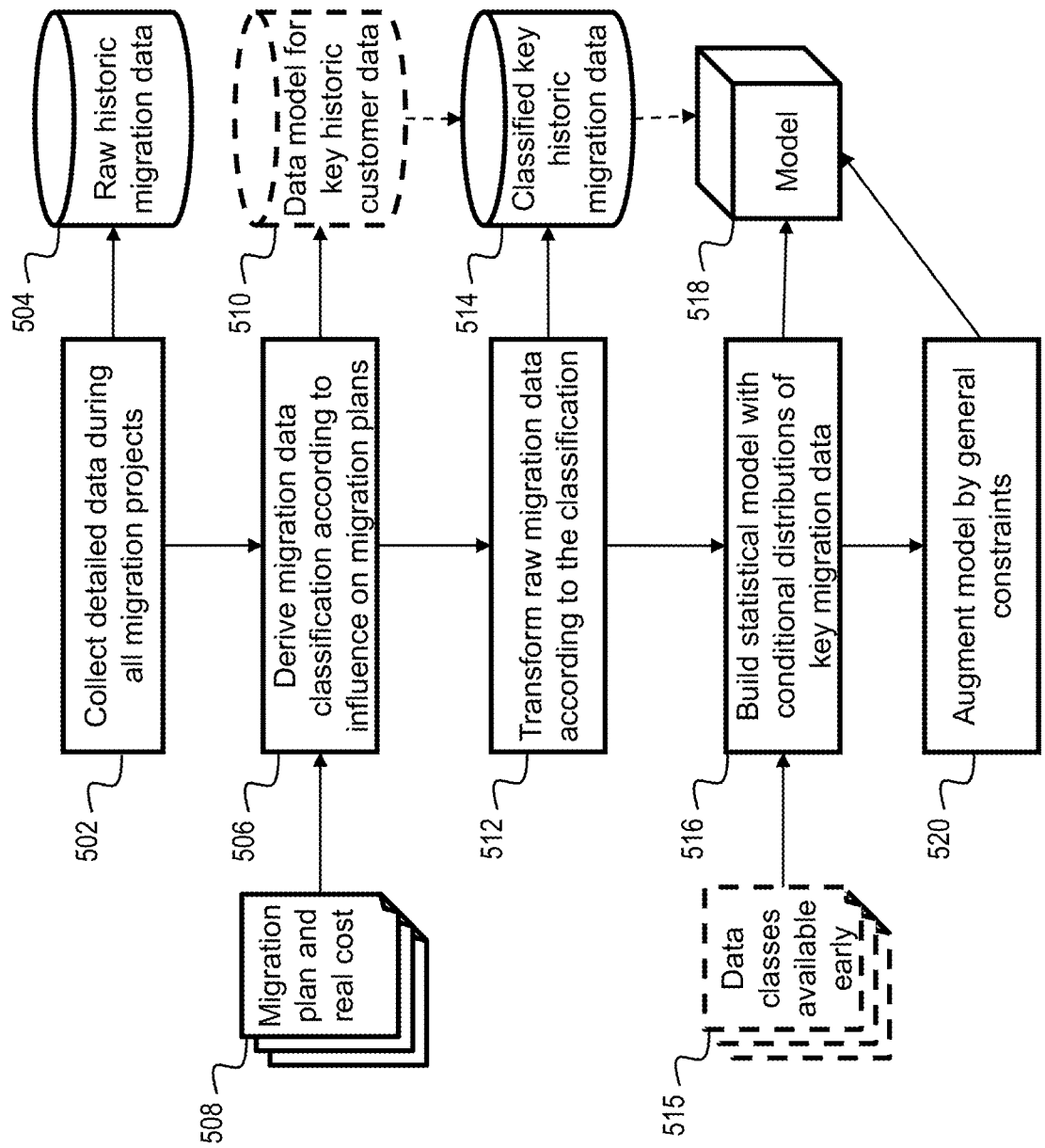
FIG. 5 depicts an exemplary flow chart for a first stage, according to an embodiment of the present invention.
Figure 6:
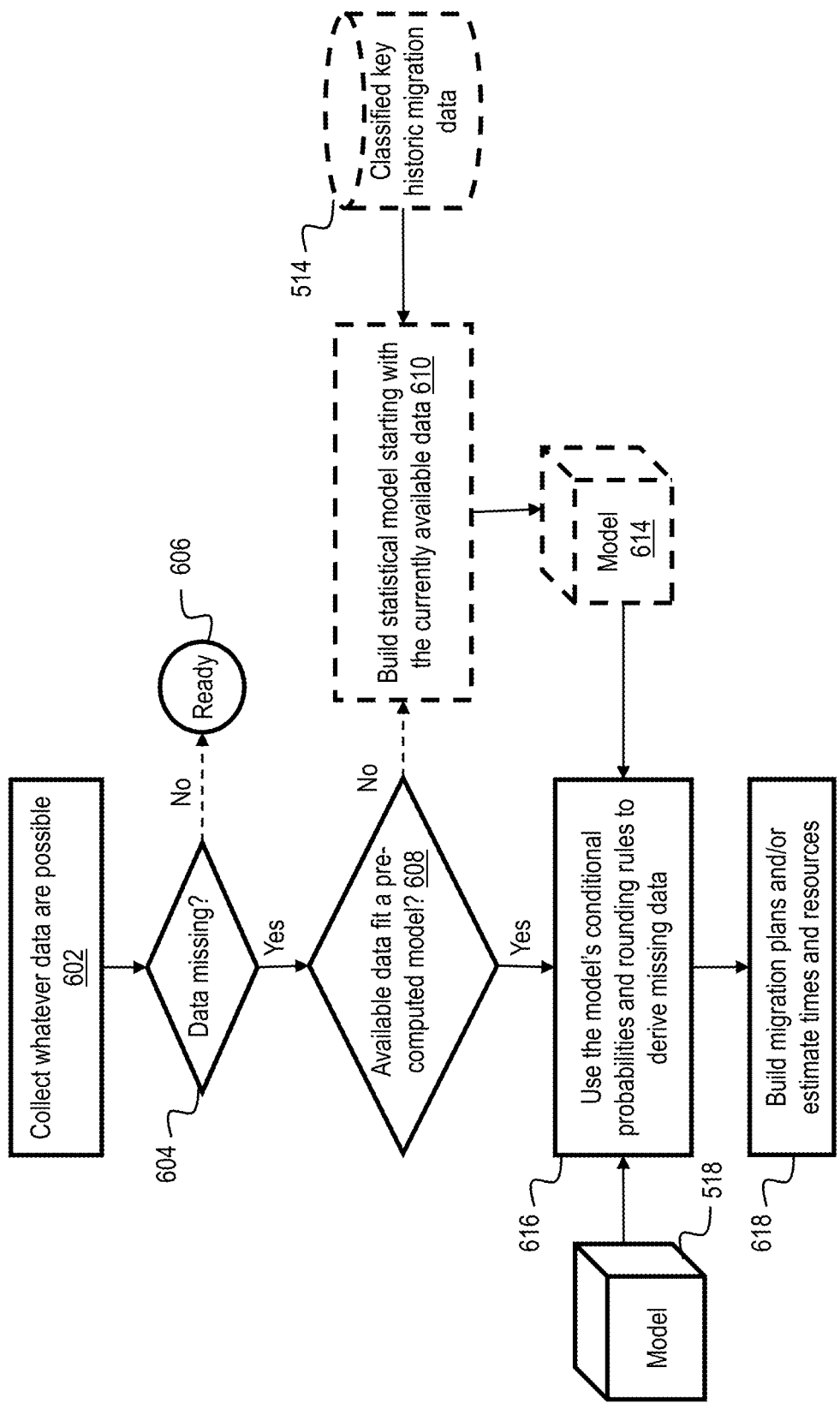
FIG. 6 depicts an exemplary flow chart for a second stage, according to an embodiment of the present invention.

The steps in FIG. 5 may be repeated after every new migration project. However, the data classification 506 will typically be kept relatively constant over longer periods with infrequent modification. The model is for one or more typical orders of data classes, according to experience regarding which ones were available early in prior projects and which ones were missing. The model 518 includes conditional probabilities of certain data classes given one or more other data classes, rounding rules, and general constraints.

As seen in FIG. 6, stage 2 can be implemented, for example, at the beginning of a specific (new) migration project, typically in the early planning phase, where not all desired data are available or can easily be obtained. In step 602, collect whatever data is available. In decision block 604, determine whether any data is missing; if not, as at 606, all is in readiness to proceed. If data is missing, proceed to decision block 608. Note that an affirmative answer to "data missing" can also be provided in cases when data is present but appears to be unreliable.

In decision block 608, determine whether the available data fit a pre-computed model (e.g., model 518 from stage 1). If so, in step 616, augment this data according to the statistic model 518 to derive at least the key factors. In step 618, estimate times and resources, and optionally build sample plans, given the estimated key factors.

On the other hand, if, in decision block 608, the available data do not fit a pre-computed model, proceed to step 610 and build a statistical model 614 starting with the currently available data, based on classified key historic migration data 514. The method to build a new statistical model, if needed, is the same as in stage 1, only with a different order of data classes.

One or more embodiments can be offered as a product and/or as a web-based (or other) service allowing migration cost estimation.

One or more embodiments are useful, for example, when migrating to a cloud environment or when migrating to provision of IT services by a third party. The more these are standardized, the larger the transformations that are needed initially. Because transformation is a risky part of these migration processes for an enterprise, customers typically look at it very closely.

FIG. 7 shows non-limiting exemplary pertinent data classes. Other embodiments could have different pertinent data classes.

Consider now a non-limiting example. In general, in the raw historic data collected during the main phase of migration projects, typically almost all data from the list in FIG. 7 is available. Early in the planning phase of a migration project, typically obtain the number of servers per operating system class, but not always how many servers are virtual or physical. However, both these data classes are important for migration planning Now, assume the historic data includes 10000 servers; that 7000 were Windows and 3000 were UNIX (including Linux); and that 4300 were physical and 5700 virtual. More precisely, suppose 2800 were Windows/physical, 4200 Windows/virtual, 1500 Unix/physical and 1500 UNIX/virtual.

Suppose, in the planning phase of a new project, it is learned that it is necessary to migrate 200 Windows servers and 100 UNIX servers, but the actual physical/virtual spread is unknown. With the historic data, estimate that 40% of the Windows servers are physical and 50% of the Linux servers are physical; thus, base early migration estimates on 80 Windows/physical, 120 Windows/virtual, 50 UNIX/physical, and 50 UNIX/virtual.

Note that this yields 170 virtual and 130 physical servers, which is a different overall virtual/physical distribution than in the historic data. This is because the actual Windows/UNIX distribution has been provided, and same is different from the historical data. In one or more embodiments, use the actual data as much as possible and only when there is no actual data use distributions from the historical data. Even then, in one or more embodiments, use conditional probabilities based on actual distribution if possible. If the operating system (OS) distribution had not been available, only the fact that there are 300 servers, instead estimate that there are 210 Windows, 90 UNIX, and then 84 Windows/physical, 126 Windows/virtual, 45 UNIX/physical, and 45 UNIX/virtual.

In some embodiments, continue with other parameters required for planning Each time when moving to a new parameter, use conditional distributions, if possible, based on previously derived distribution for parameters that the new parameter may depend on. For example, next estimate the storage sizes of the servers (operating system instances) with different distributions for Windows/physical, Windows/virtual, Unix/physical and UNIX/virtual. In fact, UNIX servers may tend to be larger, and also the operating system instances that were not yet virtualized might be larger than those that were.

When the numbers get "small" after a period of time, utilize intelligent rounding as discussed further below. Furthermore, at least some embodiments use general constraints to derive parameters without the need for detailed statistics.

The fact that 40% of Windows servers are physical and so are 50% of the Linux servers is, in at least some cases, part of the statistical model and thus pre-computed. Accordingly, in the planning phase, a tree of such conditional probabilities can simply be followed, instead of working with the large set of historic data directly. See decision block 608, "YES" branch.

However, if it is known that out of 1000 servers only 300 of them are virtualized, and the OS distribution is not known, return to the historic data and compute the converse conditional probability: Of 4300 physical servers, 2800 were Windows, and of 5700 virtual servers 4200 were Windows. Therefore, estimate 700*28/43+300*42/57≈456+221=677 Windows servers and 323 UNIX servers for this customer. This means that if a distribution for a parameter is not available to estimate the distribution of its dependent parameter based on conditional probabilities, then, in one or more embodiments, use the overall distribution patterns from the historical data.

Some parameters may be independent of others, and overall estimated probabilities can be used (say, that 10% of all servers were regulated, no matter what OS and virtualization); however, complete independence is unlikely for most of the data classes in FIG. 7, and at least pairwise independence should, in at least some embodiments, be carefully validated on the historic data.

Figure 8:
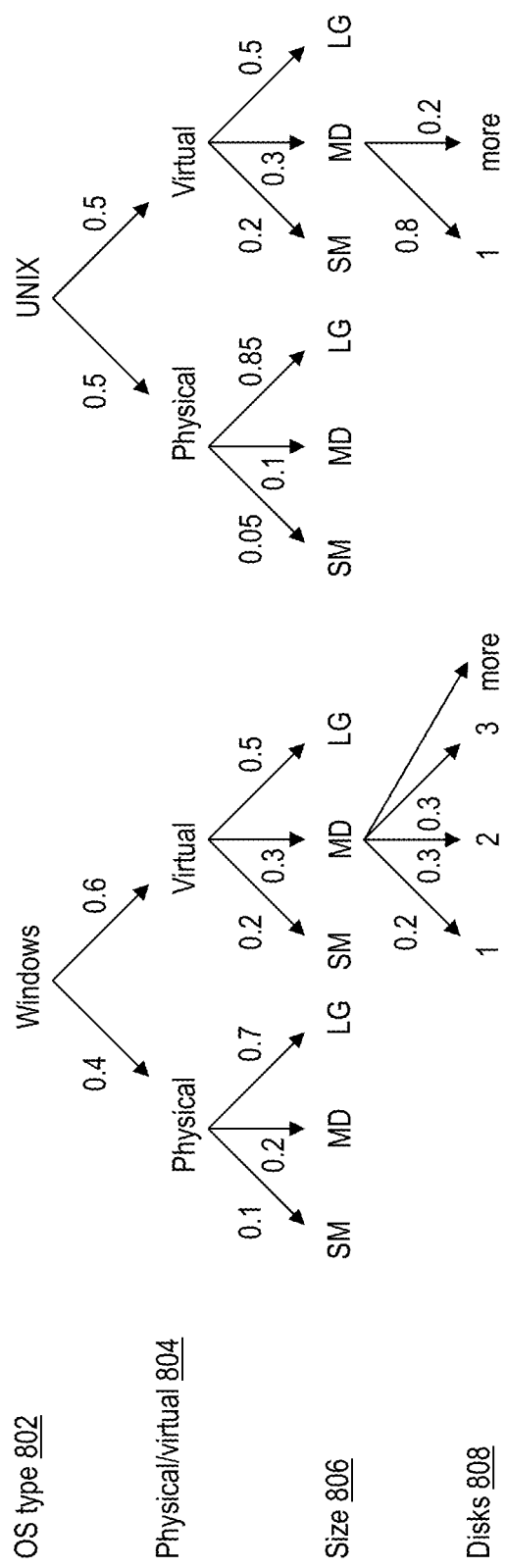
FIG. 8 depicts an exemplary sample portion of a probability tree, according to an embodiment of the present invention.

FIG. 8 shows a sample portion of a probability tree. Probabilities rather than percentages are employed, e.g., 0.4 instead of 40%. Sample parameters are OS type 802, whether physical or virtual 804, size 806, and number of disks 808. Whether the OS type 802 is Windows or UNIX is important for migration planning because different skill sets must be reserved. Furthermore, it is typically a parameter that is known by customers. Whether the server is physical or virtual 804 is important because migration of physical servers is more difficult (either still needs a P2V operation or a physical move or reinstall). Size 806 impacts expected steady-state costs; for physical machines also the ability to be virtualized. In the raw historic data, real details of sizes (number of CPUs, CPU speed, memory size, IO and network capabilities, disk size, and the like) may be given, but those are often not available in advance, and to keep the statistics relevant, they are classified into small (SM), medium (MD), and large (LG) in the example of FIG. 8. The number of disks 808 may be important separately from the size, e.g., for local versus storage area network (SAN) plans and for cloud compatibility. If a tool in accordance with one or more embodiments requires the actual filling of missing data to the input data set, the system can generate the missing data according to the derived distribution and randomly fill it into its respective location(s) in the data set.

One or more embodiments thus provide a method for data collection for migration estimation, including the steps of collecting migration information that is necessary to migration from one or more first computer systems to one or more second computer systems; classifying the migration information into information groups, each information group having one or more information attributes; and creating a statistical model of the migration information that includes conditional distributions of one or more of the information attributes given other information attributes.

In some cases, the information groups include one or more of the following: operating system (OS), software and function, and hardware (see generally FIG. 7 OS, software and function, hardware, storage, criticality, clusteredness, special factors, and "profile" data classes).

In some embodiments, the information group is the type of operating system, and the information attributes include one or more of the following: class, name, and version (refer to the subcategories under class "operating system" in FIG. 7).

In some embodiments, the information group is the type of software and function, and the information attributes include one or more of the following: function type, environment, software name, software version or age (refer to the subcategories under class "software and function" in FIG. 7).

In some embodiments, the information group is the type of hardware, and the information attributes include one or more of the following: whether virtualized, platform, vendor, model and age, and model and size (refer to the subcategories under class "hardware" in FIG. 7).

In some embodiments, the information group is the type of storage, and the information attributes include one or more of the following: whether local, storage area network (SAN), or network-attached storage (NAS); size allocated and size used (refer to the subcategories under class "storage" in FIG. 7).

In some embodiments, the information group is the level of criticality, and the information attributes include one or more of the following: critical or not critical, or alternatively high criticality, medium criticality, or low criticality; exact service level agreement (SLA); whether regulated (refer to the subcategories under class "criticality" in FIG. 7).

In some embodiments, the information group is the level of clusteredness, and the information attributes include one or more of the following: clustered or not clustered; whether there are partners; whether load-balanced (refer to the subcategories under class "clusteredness" in FIG. 7).

In some embodiments, the information group includes special factors such as disk encryption (refer to the subcategories under class "special factors" in FIG. 7).

In some embodiments, the information group includes "profile" data classes such as industry and country (refer to the subcategories under class "'profile' data classes" in FIG. 7).

In some cases, the statistical model represents one or more of the information attributes and further represents one or more other information attributes, and the first information attributes are conditionally determined by the other information attributes.

In some embodiments, the first information attribute is operating system type 802 and the other information attribute is whether physical or virtual 804. Any of the other possibilities of FIG. 8 can also be present in one or more embodiments.

Note that information groups are also referred to herein as classes and information attributes are also referred to herein as attributes for the classes.

In another aspect, a data migration planning method includes the steps of: collecting migration information that is necessary to migration from one or more first computer systems to one or more second computer systems; classifying the migration information into information groups, each information group having one or more information attributes; determining which of one or more of the information attributes is missing (or seems unreliable); selecting a statistical model based on historical data that represents the one or more information attributes that have missing data; substituting data from the statistical model into the missing data in a distribution that is determined by the conditional distribution of the information attributes in the statistical model; and basing the plans on the resulting data including substitutions.

In yet another aspect, an exemplary method for migration estimation with partial data includes the steps of collecting historic data during migration projects; and estimating migration effort (optionally including return on investment (ROI) and/or devising migration plan(s)) based on partial customer data using statistics derived from the historic data.

In some cases, the collecting step includes analyzing which dimensions of the data most influence migration plans, and/or the estimating step includes estimating the most influential dimensions based on the partial data, and estimating the effort (e.g., plans and the like) based on these most influential dimensions.

In some embodiments, estimating is done according to estimated conditional probabilities based on the historic data.

In some embodiments, effort includes migration cost, ROI, and/or other weights.

Some embodiments use ranks for rounding.

Some instances order dimensions according to impact on effort.

Some embodiments include pre-computing a tree of conditional probabilities of one dimension, as in FIG. 8.

Some instances use constraints to fill additional dimensions.

Some embodiments provide methods to compute the impact of the dimensions. Refer to the below discussion on selecting dimensions. This mostly involves the pruning of dimensions to reach a relatively small set of them that are considered having more impact. One can experiment by dropping or adding some dimensions and run the model and compare the results. For example, if we drop OS type and run the model, we would create a result that does not consider if OS would fit the cloud specifications. If we then calculate the cost of trying to fit, meaning changing the OS type in order to migration to cloud, it would be very expensive. We can determine then that the OS type dimension has very high impact.

In some cases, collecting includes validating estimates based on real data from the same projects.

Some embodiments use profiles (sub-statistics) based on external factors, such as the sector of the enterprise. Here, classify models based on industry sectors. For example, consider banking vs. manufacturing vs. retail. It is possible that different sectors may have different IT resources profiles (e.g., banking is more reliant on mainframe for reliability) which influences the statistical models. To augment missing data, the selection of particular models can then be influenced by the sector that the customer is in.

Consider the mathematical setting of the historical data. Historic customer data has many dimensions. For example, a key summary table per server might have 200 columns, and there are many other tables, e.g., listing all software per server. There are some constraints among them (e.g., between hardware model and configurations such as memory size, CPU speed, etc., or between the hardware model and the operating systems that exist for that model), but still there are many free dimensions. For simplicity, assume that these are parameters $d_1, \ldots, d_n$ with domains $D_1, \ldots, D_n$. Even if a sample set of historic data from N=100000 servers was available (more than almost any collection could at present have), the cardinality $|D_1| \cdot \ldots \cdot |D_n|$ is much larger. Thus, historic data typically cannot be used to estimate every basic probability $P(d_1, \ldots, d_n)$ by the corresponding relative frequency. More precisely, this is $P(d_1=v_1, \ldots, d_n=v_n)$ for values $v_1 \in D_1, \ldots, v_n \in D_n$. The corresponding relative frequency is x/N where N is the sample size (here number of servers) and x the count among them of samples that have values $d_1=v_1, \ldots, d_n=v_n$.

However, the historic data can be used to estimate the summarized probabilities $P(d_i)$ for each i, and also joint probabilities for small subsets of the dimensions $P(d_{i1}, \ldots, d_{ik})$. Thus, it is also possible to estimate conditional probabilities $P(d_j | d_{i1}, \ldots, d_{ik}) = P(d_j, d_{i1}, \ldots, d_{ik})/P(d_{i1}, \ldots, d_{ik})$ for cases where the sample corresponding to $P(d_{i1}, \ldots, d_{ik})$ is still of significant size. In the following, the notation $P(\ldots)$ is used for these estimated probabilities. Note that they change over time, with additional historic data.

Consider the mathematical setting of the customer data. When new partial customer data is obtained, in particular if it is a pre-prepared set of data that the customer happens to have from the customer's current asset management, configuration management, etc., it also has multiple dimensions. An exemplary first step is to map those to the given dimensions of the historic data. In the following, assume that this has been done. The data may be partial across and within dimensions, as FIG. 4 indicates: Assume S is a column of server names, with 3 columns of data $d_1, d_2, d_3$. Then $d_1$ is completely present in the sample of customer A at 406, $d_2$ completely missing, and $d_3$ partially filled. For customer B at 408, note similar data in the form of counts. Note that this means that the cross-correlation of $d_1$ and $d_3$ is missing in this case. This is not unrealistic, e.g., a customer might know the number of servers from asset management, and the number of software types from license management, but not where each piece of software is located.

Consider a non-limiting example of basic estimation. Assume that the customer data set C only includes a few dimensions $d_1, \ldots, d_m$, that it is complete in these dimensions, that the domains $D_1, \ldots, D_m$ are relatively small (e.g., sets like {Windows, UNIX} rather than "memory used"), and that all sets $\{c \in C | c.d_1=v_1, \ldots, c.d_m=v_m\}$ are of significant size or empty. Here, $c.d_k$ denotes the value of dimension k in data element (row) c. For example, if the datasets of customer A in FIG. 4 are denoted by the server names, xxx.$d_i$=a. Also assume that plans can be built from dimensions $d_1, \ldots, d_m$ and $d_{m+1}, \ldots, d_{m+l}$. Hence it is required to estimate dimensions $d_{m+1}, \ldots, d_{m+l}$. In this simple case, carry out the estimation as follows: For each tuple $v_1 \in D_1, \ldots, v_{m+l} \in D_{m+l}$, estimate that:

$$|\{c \in C \mid c \cdot d_1 = v_1, \ldots, c \cdot d_{m+\ell} = v_{m+\ell}\}| =$$
$$|\{c \in C \mid c \cdot d_1 = v_1, \ldots, c \cdot d_m = v_m\}| \cdot$$
$$P(d_{m+1} = v_{m+1}, \ldots, d_{m+\ell} = v_{m+\ell} \mid d_1 = v_1, \ldots, d_m = v_m).$$

Finally, if each of these results happened to be an integer number, these could be taken as server counts with the relevant properties, and thus as the counts of the corresponding migration plans. From there, costs, and, to some extent, timelines, can be derived.

Even if all the initial assumptions of the above simple case can be fulfilled, it is unlikely that the results will be integer numbers. Hence, one or more embodiments provide one or more intelligent rounding schemes. If only resource estimates are of interest, it is possible to also maintain the fractional numbers, e.g., if 10.3 servers were computed for plan X with resources $R_X$ and 4.7 servers for plan Y with resources $R_Y$, resources can be estimated as $10.3 \cdot R_X + 4.7 \cdot R_Y$. A pertinent application need in rounding is not to change the overall server count, or even any counts given by the customer. Hence, one or more embodiments do not round each result individually; instead, joint methods are employed within each set $S=\{c \in C | c.d_1=v_1, \ldots, c.d_m=v_m\}$. This set has at most $|D_{m+1}| \cdot \ldots \cdot |D_{m+l}|$ subsets $\{c \in C | c.d_1=v_1, \ldots, c.d_{m+l}=v_{m+l}\}$ with non-zero estimates that require rounding. Refer to the subsets $S_j$ with estimates $e_j$.

A first method is to compute the sum E of the truncated values $\lfloor e_j \rfloor$ (i.e., rounded down), compute the difference $|S|-E$, round up the $|S|-E$ values $e_j$ with the largest fraction parts $e_j - \lfloor e_j \rfloor$, and round down the remaining ones.

If there is an order among dimensions according to their impact on the plans, it is possible to instead proceed dimension by dimension, so that the more important dimensions get less distorted by rounding. For example, if $d_{m+1}$ is the most important estimated dimension, initially consider the subsets $\{c \in C | c.d_1=v_1, \ldots, c.d_{m+1}=v_{m+1}\}$ and their estimates, and round those up and down similar to the first method. Within each of these subsets, then proceed to the second-most important estimated dimension, and so on.

Instead of choosing which values to round up or down in the previous method by the size of the fraction parts, in another aspect, it is possible to also build a ranking of the values to choose in advance. For example, if dimension $d_{m+1}$ is the age of an operating system, and possible values are 1, 3, or 5 years, they can be ranked:

3, 1, 5 if 3 is the most common in general and 1 is next
or 3, 5, 1 if 3 causes medium cost in the plan and 5 the most, and it is desired to obtain a good average of the cost but with a slight tendency to overestimate rather than underestimate
or 5, 3, 1 if it is preferred to overestimate.

The ranking means that for the $|S|-E$ values that should be rounded up, choose=the highest-ranked ones. For example, if $|S|-E=2$ and with the ranking 3, 1, 5, round the estimates for 3 and 1 up, and that for 5 down.

If treated dimension by dimension, in particular with ordering, then instead of estimating the entire set of dimensions initially as:

$$|\{c \in C | c \cdot d_1 = v_1, \ldots, c \cdot d_{m+\ell} = v_{m+\ell}\}| =$$
$$|\{c \in C | c \cdot d_1 = v_1, \ldots, c \cdot d_m = v_m\}| \cdot$$
$$P(d_{m+1} = v_{m+1}, \ldots, d_{m+\ell} = v_{m+\ell} | d_1 = v_1, \ldots, d_m = v_m).$$

the dimensions can be estimated one by one according to their order, and the already rounded values taken for the earlier dimensions when estimating the next dimension.

This, together with ranking, is done in one or more embodiments.

Figure 10:
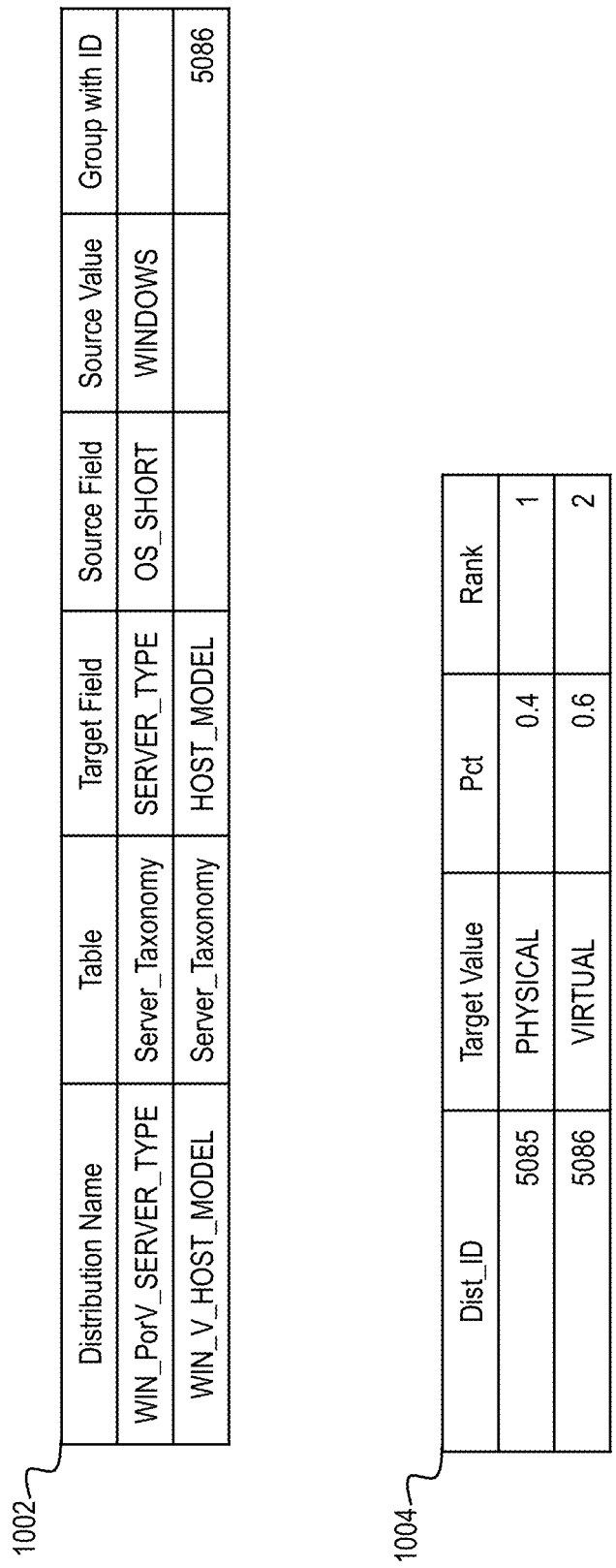
FIG. 10 depicts exemplary details of the screen shot of FIG. 9, according to an embodiment of the present invention.

Consider now FIGS. 9 and 10. Table 1002 lists distributions, concretely conditional distributions of one dimension, represented in "Target_Field" of "Table," given other dimensions. Each distribution has a name in the first column. The actual distribution is shown in the lower field when a distribution is selected in the upper table, e.g., here "WIN_PorV_SERVER_TYPE". It has two values "PHYSICAL" and "VIRTUAL" with probabilities (in the column "Pct" in the lower table 1004) 0.4 and 0.6, respectively. The last column contains ranks for rounding.

If a distribution is conditioned on only one other dimension, the condition is given in "Source_field" and "Source_value." For example, in FIGS. 9 and 10, distribution "WIN_PorV_SERVER_TYPE" has condition "OS_SHORT=WINDOWS." Hence, e.g., the upper row of the lower field represents the conditional probability:

P(SERVER_TYPE=PHYSICAL|OS_SHORT=WINDOWS)=0.4.

If a distribution is conditioned on multiple other dimensions, the condition is given in "Group with ID," which refers to the "Dist_ID" of a specific value in another distribution. For example, the distribution WIN_V_HOST_MODEL has condition Dist_ID=5086, which denotes the value "VIRTUAL" in distribution WIN_PorV_SERVER_TYPE. Hence a row in the lower table 1004 for WIN_V_HOST_MODEL (not shown here for illustrative brevity), represents a conditional probability:

P(HOST_MODEL=|OS_SHORT=WINDOWS
∧SERVER_TYPE=PHYSICAL)= . . . (where ∧ denotes the logical "AND").

Consider now constraints. If certain dimensions are not independent, but there are constraints between them, the historic probabilities will reflect that. For example, if $d_1=v_1$ is incompatible with $d_2=v_2$, the probability $P(d_2=v_2|d_1=v_1)$ estimated from historic data will indeed always be zero. On the other hand, if $d_1=v_1$ implies $d_3=v_3$, always obtain $P(d_3=v_3|d_1=v_1)=1$. Hence there is no absolute need to consider constraints separately.

However, constraints can be used, in particular implications (such as "$d_i=v_1$ implies $d_3=v_3$") to speed up the procedure, or to still add dimensions when otherwise in a formula $P(d_j|d_{i1}, \ldots, d_{ik})=P(d_j, d_{i1}, \ldots, d_{ik})/P(d_{i1}, \ldots, d_{ik})$ the sample corresponding to $P(d_i, \ldots, d_{ik})$ would be too small for a useful estimate.

Figure 11:
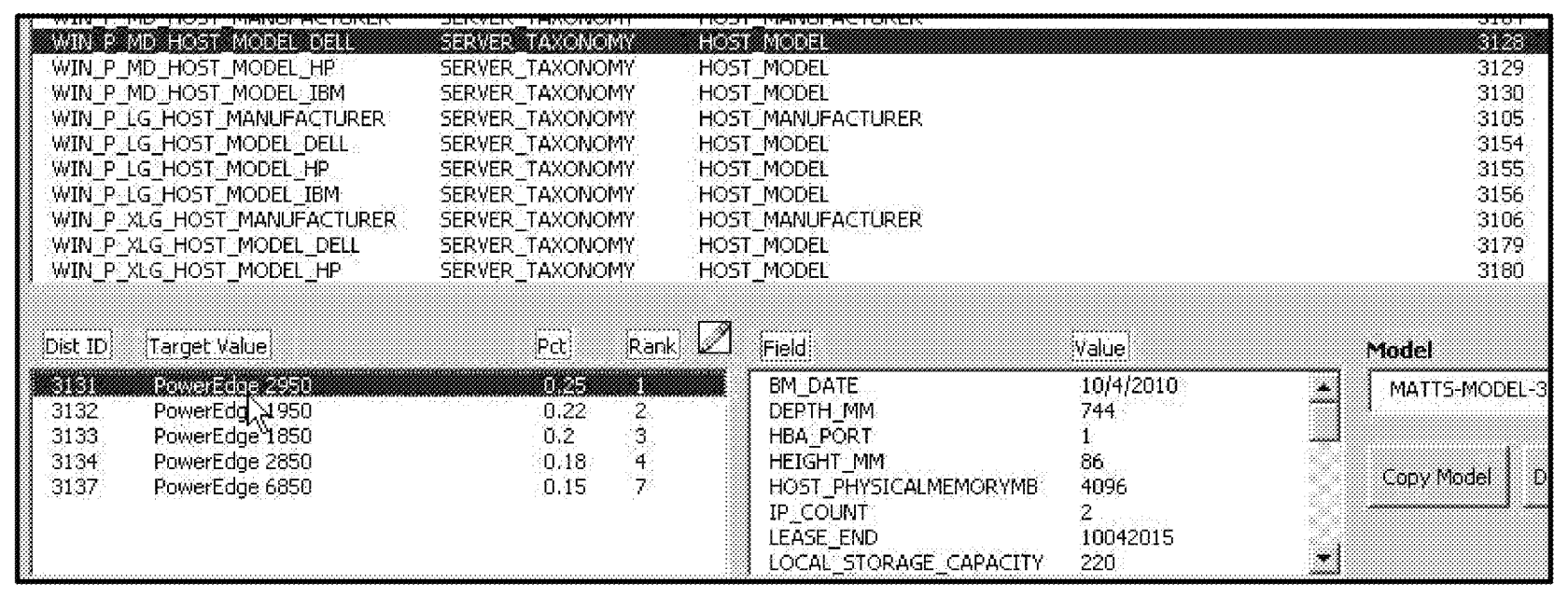

A sample in a non-limiting exemplary embodiment is shown in FIG. 11. When HOST_MODEL=PowerEdge2950 and all other conditions under Dist_ID 3128 hold, all fields in the right lower panel have the given values (e.g., Field BM_DATE has value Oct. 4, 2010 and so on).

Selecting dimensions: Consider now the selection of dimensions. Typical data as collected for migrations has too many dimensions to estimate them all from realistic sets of historic data. If the current level of migration planning is only based on a well-defined small set of dimensions, then those are the ones that need to be estimated, as far as they cannot be obtained from available data sources in the planning phase. If the customer data set is large enough to reasonably estimate those dimensions (i.e., the last estimates won't mostly be smaller than one and thus only the rounding algorithms would play a role), then it is possible to simply use the techniques described so far.

For the other cases, an ordering of the dimensions according to their importance in planning is desired, so that the most important ones are estimated first and thus most precisely. Given the plans or a plan generation algorithm, and an overall measure of effort associated with each plan the plan, this can be decided as follows. Where a part or aspect of a plan can be derived from a subset $d_{i1}, \ldots, d_{ik}$ of the dimensions, and the effort for this part or aspect is additive with that of the plan for the remaining dimensions, the impact of these dimensions can be evaluated separately from others. For example, a database upgrade might only depend on the presence, model, and version of a database (and possibly other database parameters), but not on the operating system, hardware, and so on. Let such a partial plan be $\pi=\Pi(d_{i1}, \ldots, d_{ik})$ and its effort $E(\pi)$. In practice, in particular at the beginning of the use of this method with few historic data, the ordering of the dimensions can be obtained, for example, by estimates of practitioners.

For such a subset, its impact can be estimated, e.g., by one of the following methods:

max($\{E(\pi)|\pi=\Pi(v_{i1}, \ldots, v_{ik})$ with $v_{i1} \in D_{i1}, \ldots, v_{ik} \in D_{ik}\}$)−min($\{E(\pi)|\pi=\Pi(v_{i1}, \ldots, v_{ik})$ with $v_{i1} \in D_{i1}, \ldots, v_{ik} \in D_{ik}\}$).

The average distance of $|E(\pi)-Avg(E(\pi))|$, where the range of it is as above.

The statistical variance of E(it).

Any of the above three formulas, but with the averages weighted by the distribution $P(d_{i1}, \ldots, d_{ik})$ as estimated from the historic data.

If the impact of a specific dimension, say $d_{i1}$, in such a subset is desired, first compute a value $E(v_{i1})$ for each $v_{i1} \in D_{i2}$ as the average of $E(\pi)$ for the plans $\pi = \Pi(v_{i1}, \ldots, v_{ik})$ with $v_{i2} \in D_{i2}, \ldots, v_{ik} \in D_{ik}$ (standard or weighted by the estimated distribution $P(d_{i2}, \ldots, d_{ik}|d_{i1})$). Then take a variance-style formula over these values as above; e.g., corresponding to the first formula, take $\max(\{E(v_{i1})|v_{i1} \in D_{i1}\}) - \min(\{E(v_{i1})|v_{i1} \in D_{i1}\})$.

By analyzing different dimensions or small groups of dimensions by the same of the above alternative formula, it is possible to compare their impact, and estimate them according to highest impact first. Human knowledge of the construction of the migration plans and the impact of certain factors in them can be an alternative or an estimate, in particular if the plans are a bit vague and don't come with precise effort estimates.

Consider summarized customer data. If only summarized customer data is obtained, as in Scenario B, 408 in FIG. 4, a problem occurs if the summaries are independent for dimensions that are not independent for plan effort. For example, suppose data is provided indicating that there are 100 servers, 50 of them Windows and 50 UNIX, and 50 virtual and 50 physical. However, suppose the plans and their efforts are such that it makes a difference whether, for example, there are 50 virtual Windows servers and 50 physical Linux servers or vice versa. It is possible to take one of the dimensions and estimate the other from the historic data. In some cases, that coincides with the second dimension. For example, if Windows servers are virtual with probability 0.4, and UNIX servers with probability 0.6, then estimate that there are twenty virtual Windows servers and 30 virtual UNIX servers. However, if Windows servers are virtual with probability 0.4, and UNIX servers with probability 0.8, the normal estimation formula in accordance with one or more embodiments yields 20 virtual Windows servers and 40 virtual UNIX servers, which are 60 virtual servers instead of 50.

Inasmuch as it is not desired to deviate from explicitly given data, it is appropriate to adapt the distributions. One way of doing it in this example is to take only one estimate from the historic data, and compute all other values from the given sums. For example, adhering to estimating 20 virtual Windows servers, obtain an estimate of 30 virtual UNIX servers, 30 physical Windows servers, and 20 physical UNIX servers. Generalizing this to more than two values per dimension, say k and j, estimate the numbers for the first j−1 values of the second dimension according to the first k−1 values of the first dimension, and fill in the rest according to the given sums. Only if the sums are already exceeded earlier, assign zeroes earlier.

One or more embodiments advantageously employ multi-dimensional models. Furthermore, one or more embodiments address the case where there is certain missing data about certain servers and this data is estimated based on large data sets of other servers.

One or more embodiments employ a statistical model addressing entire servers with many dimensions such as OS, software running, regulatory constraints, and the like, and with much more general migration tasks than merely assigning to a VM. This is why one or more embodiments use information regarding groups or layers and conditional probabilities between them. In one or more embodiments, the statistical model estimates such parameters for a set of servers based on historical data about other servers.

Again, one or more embodiments carry out statistical modeling of unknown data from known data.

In one or more embodiments, there are multi-dimensional objects to migrate and thus information groups or layers, and estimation of unknown from historical data from other devices or processes.

Thus, one or more embodiments employ a statistical model with multi-dimensional data and inference from other server groups.

Given the discussion thus far, it will be appreciated that, in general terms, an exemplary method, according to an aspect of the invention, includes the step 502 of obtaining access to raw historic information technology migration data 504; as well as the step 512 of transforming the raw historic information technology migration data in accordance with a classification scheme to obtain classified key historic information technology migration data 514. A further step (see 515, 516, 518) includes building a statistical model with conditional distributions of the key historic information technology migration data. A still further step 602 includes, prior to a new information technology migration project, obtaining access to incomplete data characterizing the new information technology migration project. In this context, "incomplete" means that at least some data is missing and/or unreliable. Yet a further step 616 includes using the statistical model 518 to derive data missing from the incomplete data characterizing the new information technology migration project, to obtain derived data. Another step 618 includes creating at least one of a migration plan and an estimate for the new information technology migration project based on the incomplete data and the derived data.

In some cases, a further step (see 506, 508, 510) includes deriving the classification scheme according to influence of classes on migration plans, based on at least one existing migration plan with associated real costs. Such deriving can include, for example, deriving the classification scheme with at least two classes including at least two of operating system, software type, hardware type, storage type, criticality, and clusteredness.

Furthermore, in some such cases, the deriving includes deriving the classification scheme with attributes for each of the at least two classes; the at least two classes include operating system and hardware type; the attributes for operating system include class, name, and version; the attributes for hardware include whether virtualized, platform type, vendor, model, age, and size; the statistical model includes conditional probability of whether hardware is virtualized based on operating system class; the incomplete data includes operating system per server type without data indicating whether virtualized; and the derived data includes whether virtualized per operating system per server type, in accordance with the conditional probability.

On the other hand, in some such cases, the deriving includes deriving the classification scheme with attributes for each of the at least two classes; the at least two classes include operating system and hardware type; the attributes for operating system include class, name, and version; the attributes for hardware include whether virtualized, platform type, vendor, model, age, and size; the statistical model includes conditional probability of operating system class based on whether hardware is virtualized; the incomplete data includes data indicating whether virtualized without operating system per server type; and the derived data includes operating system per server type, in accordance with the conditional probability.

In some cases, an additional step 520 includes augmenting the statistical model by general constraints.

In some cases, the incomplete data includes first incomplete data, the new information technology migration project includes a first new information technology migration project, the derived data includes first derived data, the statistical model includes a first statistical model, and the at least one of a migration plan and an estimate includes a first at least one of a migration plan and an estimate. Further steps then include, prior to a second new information technology migration project, as at 602, obtaining access to second incomplete (see discussion of "incomplete" above) data characterizing the second new information technology migration project; as at the NO branch of block 608, determining that the second incomplete data do not fit the first statistical model; and, as at 610, building a second statistical model 614 based on the second incomplete data and the classified key historic information technology migration data 514. Additional steps include, as at 616, using the second statistical model 614 to derive data missing from the second incomplete data characterizing the second new information technology migration project, to obtain second derived data; and, as at 618, creating at least one of a migration plan and an estimate for the new information technology migration project based on the incomplete data and the derived data.

In some cases, in the incomplete data, data is missing across multi-dimensions, and further steps include filling missing data for some of the dimensions using patterns from the historical data, and using patterns from existing partial data to augment remaining ones of the dimensions with missing data.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

As noted elsewhere herein, computer program code for carrying out operations for aspects of the present invention may be written in any combination of one or more programming languages, including an object oriented programming language such as Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). One or more embodiments are particularly significant in the context of a cloud or virtual machine environment, although this application is exemplary and non-limiting. Reference is made back to FIGS. 1-3 and accompanying text.

It should be noted that any of the methods described herein can include an additional step of providing a system including distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures. In a non-limiting example, a customer data estimation engine module running on one or more hardware processors implements engine 404; a plan generation engine module running on one or more hardware processors implements engine 414; and a suitable database access module is provided (e.g., a relational database management system). The method steps can then be carried out using the distinct software modules and/or sub-modules of the system, as described above, executing on one or more hardware processors such as 16. For example, the database access module accesses data in the databases and manipulates same; the engine 404 develops the derived data; and the engine 414 creates the migration plan. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving functionality of one or more computer systems with information technology migration to a cloud computing environment over one or more computer networks, the method comprising:
    obtaining access to raw historic information technology migration data, the raw historic information technology migration data comprising at least one previously executed information technology migration plan and at least one cost associated with previous execution of said at least one previously executed information technology migration plan;
    deriving a classification scheme at least in part by ranking one or more key factors based on their effect on said at least one cost associated with said at least one previously executed information technology migration plan;
    transforming said raw historic information technology migration data in accordance with said classification scheme to obtain classified key historic information technology migration data;
    building a statistical model with conditional distributions of said key historic information technology migration data;
    prior to a new information technology migration project, obtaining access to incomplete data characterizing said new information technology migration project;
    using said statistical model to derive data missing from said incomplete data characterizing said new information technology migration project, wherein at least a portion of said derived data is rounded based on said ranking of said one or more key factors;
    creating a migration plan for said new information technology migration project based on said incomplete data and said derived data; and
    executing said new information technology migration project at least in part by migrating said one or more computer systems to said cloud computing environment over said one or more computer networks in accordance with said migration plan, thereby improving functionality of said one or more computer systems.

2. The method of claim 1, further comprising deriving said classification scheme according to influence of classes on migration plans, based on at least one existing migration plan with associated real costs.

3. The method of claim 2, wherein said deriving comprises deriving said classification scheme with at least two classes comprising at least two of operating system, software type, hardware type, storage type, criticality, and clusteredness.

4. The method of claim 3, wherein:
    said deriving comprises deriving said classification scheme with attributes for each of said at least two classes;
    said at least two classes comprise operating system and hardware type;
    said attributes for operating system comprise class, name, and version;
    said attributes for hardware comprise whether virtualized, platform type, vendor, model, age, and size;
    said statistical model comprises conditional probability of whether hardware is virtualized based on operating system class;
    said incomplete data comprises operating system per server type without data indicating whether virtualized; and
    said derived data comprises whether virtualized per operating system per server type, in accordance with said conditional probability.

5. The method of claim 3, wherein:
    said deriving comprises deriving said classification scheme with attributes for each of said at least two classes;
    said at least two classes comprise operating system and hardware type;
    said attributes for operating system comprise class, name, and version;
    said attributes for hardware comprise whether virtualized, platform type, vendor, model, age, and size;
    said statistical model comprises conditional probability of operating system class based on whether hardware is virtualized;
    said incomplete data comprises data indicating whether virtualized without operating system per server type; and
    said derived data comprises operating system per server type, in accordance with said conditional probability.

6. The method of claim 1, further comprising augmenting said statistical model by general constraints.

7. The method of claim 1, wherein, in said incomplete data, data is missing across multi-dimensions, further comprising filling missing data for some of said dimensions using patterns from said historical data, and using patterns from existing partial data to augment remaining ones of said dimensions with missing data.

8. The method of claim 1, further comprising providing a system, wherein the system comprises distinct software modules, each of the distinct software modules being embodied on a computer-readable storage medium, and wherein the distinct software modules comprise a database access module, a customer data estimation module, and a plan generation engine module;
wherein:
at least said obtaining of said access to said raw historic information technology migration data and said obtaining of said access to said incomplete data characterizing said new information technology migration project are carried out by said database access module executing on at least one hardware processor;
said using of said statistical model to derive said data missing from said incomplete data characterizing said new information technology migration project, to obtain said derived data, is carried out by said customer data estimation module executing on said at least one hardware processor; and
said creating said migration plan for said new information technology migration project based on said incomplete data and said derived data comprises creating at least said migration plan using said plan generation engine module executing on said at least one hardware processor.

9. The method of claim 1, further comprising selecting said one or more key factors based on their effect on said at least one cost associated with said at least one previously executed information technology migration plan, wherein said derived data comprises said one or more key factors.

10. A method for improving functionality of computer systems with information technology migration to a cloud computing environment over one or more computer networks, the method comprising:
obtaining access to raw historic information technology migration data;
transforming said raw historic information technology migration data in accordance with a classification scheme to obtain classified key historic information technology migration data;
building a statistical model with conditional distributions of said key historic information technology migration data;
prior to a new information technology migration project, obtaining access to incomplete data characterizing said new information technology migration project;
using said statistical model to derive data missing from said incomplete data characterizing said new information technology migration project, to obtain derived data;
creating a migration plan for said new information technology migration project based on said incomplete data and said derived data; and
executing said new information technology migration project at least in part by migrating at least a first one of computer systems to said cloud computing environment over said one or more computer networks in accordance with said migration plan, thereby improving functionality of at least said first one of said computer systems;
wherein said incomplete data comprises first incomplete data, said new information technology migration project comprises a first new information technology migration project, said derived data comprises first derived data, said statistical model comprises a first statistical model, and said migration plan comprises a first migration plan, further comprising:

prior to a second new information technology migration project, obtaining access to second incomplete data characterizing said second new information technology migration project;
determining that said second incomplete data do not fit said first statistical model;
building a second statistical model based on said second incomplete data and said classified key historic information technology migration data;
using said second statistical model to derive data missing from said second incomplete data characterizing said second new information technology migration project, to obtain second derived data;
creating a second migration plan for said second new information technology migration project based on said second incomplete data and said second derived data; and
executing said second new information technology migration project at least in part by migrating at least a second one of said computer systems to said cloud computing environment over said one or more computer networks in accordance with said second migration plan, thereby improving functionality of at least said second one of said computer systems.

11. An apparatus for improving functionality of one or more computer systems with information technology migration to a cloud computing environment over one or more computer networks, the apparatus comprising:
a memory; and
at least one processor, coupled to said memory, and operative to:
obtain access to raw historic information technology migration data, the raw historic information technology migration data comprising at least one previously executed information technology migration plan and at least one cost associated with previous execution of said at least one previously executed information technology migration plan;
derive a classification scheme at least in part by ranking one or more key factors based on their effect on said at least one cost associated with said at least one previously executed information technology migration plan;
transform said raw historic information technology migration data in accordance with said classification scheme to obtain classified key historic information technology migration data;
build a statistical model with conditional distributions of said key historic information technology migration data;
prior to a new information technology migration project, obtain access to incomplete data characterizing said new information technology migration project;
use said statistical model to derive data missing from said incomplete data characterizing said new information technology migration project, wherein at least a portion of said derived data is rounded based on said ranking of said one or more key factors;
create a migration plan for said new information technology migration project based on said incomplete data and said derived data; and
execute said new information technology migration project at least in part by migrating said one or more computer systems to said cloud computing environment over said one or more computer networks in accordance with said migration plan, thereby improving functionality of at least said one or more computer systems.

12. The apparatus of claim 11, wherein said at least one processor is further operative to derive said classification scheme according to influence of classes on migration plans, based on at least one existing migration plan with associated real costs.

13. The apparatus of claim 12, wherein said deriving comprises deriving said classification scheme with at least two classes comprising at least two of operating system, software type, hardware type, storage type, criticality, and clusteredness.

14. The apparatus of claim 11, wherein said at least one processor is further operative to augment said statistical model by general constraints.

15. The apparatus of claim 11, wherein, in said incomplete data, data is missing across multi-dimensions, wherein said at least one processor is further operative to fill missing data for some of said dimensions using patterns from said historical data, and use patterns from existing partial data to augment remaining ones of said dimensions with missing data.

16. An apparatus for improving functionality of one or more computer systems with information technology migration to a cloud computing environment over one or more computer networks, the apparatus comprising:
  a memory; and
  at least one processor, coupled to said memory, and operative to:
    obtain access to raw historic information technology migration data;
    transform said raw historic information technology migration data in accordance with a classification scheme to obtain classified key historic information technology migration data;
    build a statistical model with conditional distributions of said key historic information technology migration data;
    prior to a new information technology migration project, obtain access to incomplete data characterizing said new information technology migration project;
    use said statistical model to derive data missing from said incomplete data characterizing said new information technology migration project, to obtain derived data;
    create a migration plan for said new information technology migration project based on said incomplete data and said derived data; and
    execute said new information technology migration project at least in part by migrating at least a first one of computer systems to said cloud computing environment over said one or more computer networks in accordance with said migration plan, thereby improving functionality of at least said first one of said computer systems;
  wherein said incomplete data comprises first incomplete data, said new information technology migration project comprises a first new information technology migration project, said derived data comprises first derived data, said statistical model comprises a first statistical model, and said migration plan comprises a first migration plan, wherein said at least one processor is further operative to:
    prior to a second new information technology migration project, obtain access to second incomplete data characterizing said second new information technology migration project;
    determine that said second incomplete data do not fit said first statistical model;
    build a second statistical model based on said second incomplete data and said classified key historic information technology migration data;
    use said second statistical model to derive data missing from said second incomplete data characterizing said second new information technology migration project, to obtain second derived data;
    create a second migration plan for said second new information technology migration project based on said second incomplete data and said second derived data; and
    execute said second new information technology migration project at least in part by migrating at least a second one of said computer systems to said cloud computing environment over said one or more computer networks in accordance with said second migration plan, thereby improving functionality of at least said second one of said computer systems.

17. A computer program product comprising a computer readable storage medium having program instructions embodied therewith, wherein the computer readable storage medium is not a transitory signal per se, and wherein the program instructions are executable by a processor to cause the processor to perform a method for improving functionality of one or more computer systems with information technology migration to a cloud computing environment over one or more computer networks, the method comprising:
  obtaining access to raw historic information technology migration data, the raw historic information technology migration data comprising at least one previously executed information technology migration plan and at least one cost associated with previous execution of said at least one previously executed information technology migration plan;
  deriving a classification scheme at least in part by ranking one or more key factors based on their effect on said at least one cost associated with said at least one previously executed information technology migration plan;
  transforming said raw historic information technology migration data in accordance with said classification scheme to obtain classified key historic information technology migration data;
  building a statistical model with conditional distributions of said key historic information technology migration data;
  prior to a new information technology migration project, obtaining access to incomplete data characterizing said new information technology migration project;
  using said statistical model to derive data missing from said incomplete data characterizing said new information technology migration project, wherein at least a portion of said derived data is rounded based on said ranking of said one or more key factors;
  creating a migration plan for said new information technology migration project based on said incomplete data and said derived data; and
  executing said new information technology migration project at least in part by migrating said one or more computer systems to said cloud computing environment over said one or more computer networks in accordance with said migration plan, thereby improving functionality of said one or more computer systems.

18. The computer program product of claim 17, wherein the program instructions are further executable by a processor to cause the processor to perform a method further comprising deriving said classification scheme according to influence of classes on migration plans, based on at least one existing migration plan with associated real costs.

19. The computer program product of claim 18, wherein said deriving comprises deriving said classification scheme with at least two classes comprising at least two of operating system, software type, hardware type, storage type, criticality, and clusteredness.

20. The computer program product of claim 17, wherein:
the method further comprises providing a system, wherein the system comprises distinct software modules, each of the distinct software modules being embodied on the computer-readable storage medium, and wherein the distinct software modules comprise a database access module, a customer data estimation module, and a plan generation engine module;

at least said obtaining of said access to said raw historic information technology migration data and said obtaining of said access to said incomplete data characterizing said new information technology migration project are carried out by said database access module executing on at least one hardware processor;

said using of said statistical model to derive said data missing from said incomplete data characterizing said new information technology migration project, to obtain said derived data, is carried out by said customer data estimation module executing on said at least one hardware processor; and said creating said migration plan for said new information technology migration project based on said incomplete data and said derived data comprises creating at least said migration plan using said plan generation engine module executing on said at least one hardware processor.

\* \* \* \* \*